(12) United States Patent
Hammarin

(10) Patent No.: US 8,485,397 B2
(45) Date of Patent: Jul. 16, 2013

(54) MEASURING DEVICE

(75) Inventor: Hans Borje Hammarin, Kumla (SE)

(73) Assignee: Antula Healthcare AB, Stockholm (SE)

( * ) Notice: Subject to any disclaimer, the term of this patent is extended or adjusted under 35 U.S.C. 154(b) by 699 days.

(21) Appl. No.: 12/600,058

(22) PCT Filed: May 14, 2008

(86) PCT No.: PCT/EP2008/055904
§ 371 (c)(1),
(2), (4) Date: Nov. 13, 2009

(87) PCT Pub. No.: WO2008/138948
PCT Pub. Date: Nov. 20, 2008

(65) Prior Publication Data
US 2010/0301072 A1    Dec. 2, 2010

(30) Foreign Application Priority Data

May 16, 2007 (EP) .................................. 07108363
May 16, 2007 (NO) .................................. 20072522

(51) Int. Cl.
*G01F 11/28* (2006.01)
(52) U.S. Cl.
USPC .................. 222/449; 222/153.1; 222/153.05; 222/448; 222/453; 222/514; 222/518; 222/562; 222/568
(58) Field of Classification Search
USPC ................. 222/448–449, 442, 434, 453–454, 222/456, 511, 518, 501, 514, 567–568, 562, 222/153.1, 153.05, 153.06
See application file for complete search history.

(56) References Cited

U.S. PATENT DOCUMENTS 2,530,012 A * 11/1950 Gronemeyer et al. ........ 222/449
2,722,345 A * 11/1955 Van Buren ..................... 222/631
3,232,498 A *  2/1966 Bennett ......................... 222/449
(Continued)

FOREIGN PATENT DOCUMENTS

DE       833 013 C      3/1952
DE    31 33 835 A1     3/1983
(Continued)

OTHER PUBLICATIONS

International Search Report, corresponding to PCT/EP2008/055904, mailed on Aug. 21, 2008.
(Continued)

*Primary Examiner* — Frederick C Nicolas
(74) *Attorney, Agent, or Firm* — Renner, Otto, Boisselle & Sklar, LLP

(57) ABSTRACT

The invention relates to a measuring actuator, a measuring cap, a protective cover, a measuring unit, and a device for fixed and variable measuring and discharging of fluid from a container. The actuator being configured for detachable and movable connection to the cap and adapted for sealing off fluid when in a non-actuated state and to discharge fluid when in an actuated state, the actuator including at least two openings, a discharge opening and a fluid inflow opening; the cap-including at least three openings, a discharge opening and an actuator receiving opening and a fluid inflow opening; the measuring unit including the cap, the actuator, and a spring; the cover for protecting the measuring unit being configured for attachment to the cap and/or the measuring unit; and the measuring device including the cover, the cap, the actuator, the spring, and the container.

44 Claims, 6 Drawing Sheets

U.S. PATENT DOCUMENTS

| | | | |
|---|---|---|---|
| 3,894,661 A * | 7/1975 | Guala | 222/188 |
| 4,151,934 A | 5/1979 | Saeki | |
| 4,679,714 A * | 7/1987 | Blake | 222/449 |
| 4,993,600 A * | 2/1991 | Tucker et al. | 222/321.6 |
| 5,037,007 A * | 8/1991 | Deussen | 222/321.6 |
| 5,090,600 A * | 2/1992 | Clark | 222/492 |
| 5,850,908 A | 12/1998 | Jasek | |
| 6,085,165 A * | 7/2000 | Ulwick | 705/7.32 |
| 7,753,234 B1 * | 7/2010 | Heiberger | 222/153.09 |

FOREIGN PATENT DOCUMENTS

| | | |
|---|---|---|
| DE | 34 13 724 A1 | 10/1985 |
| DE | 92 15 130 U1 | 1/1993 |
| DE | 298 11 680 U1 | 11/1999 |
| EP | 0 202 406 A2 | 11/1986 |
| EP | 1 371 953 A1 | 12/2003 |
| WO | 2007/054797 A1 | 5/2007 |

OTHER PUBLICATIONS

Written Opinion, corresponding to PCT/EP2008/055904, mailed on Aug. 21, 2008.

International Preliminary Report On Patentability, corresponding to PCT/EP2008/055904, completed on Aug. 6, 2009.

Extended European Search Report and Examination Report (Appln No. EP 07 10 8363), dated Jan. 1, 2008.

* cited by examiner

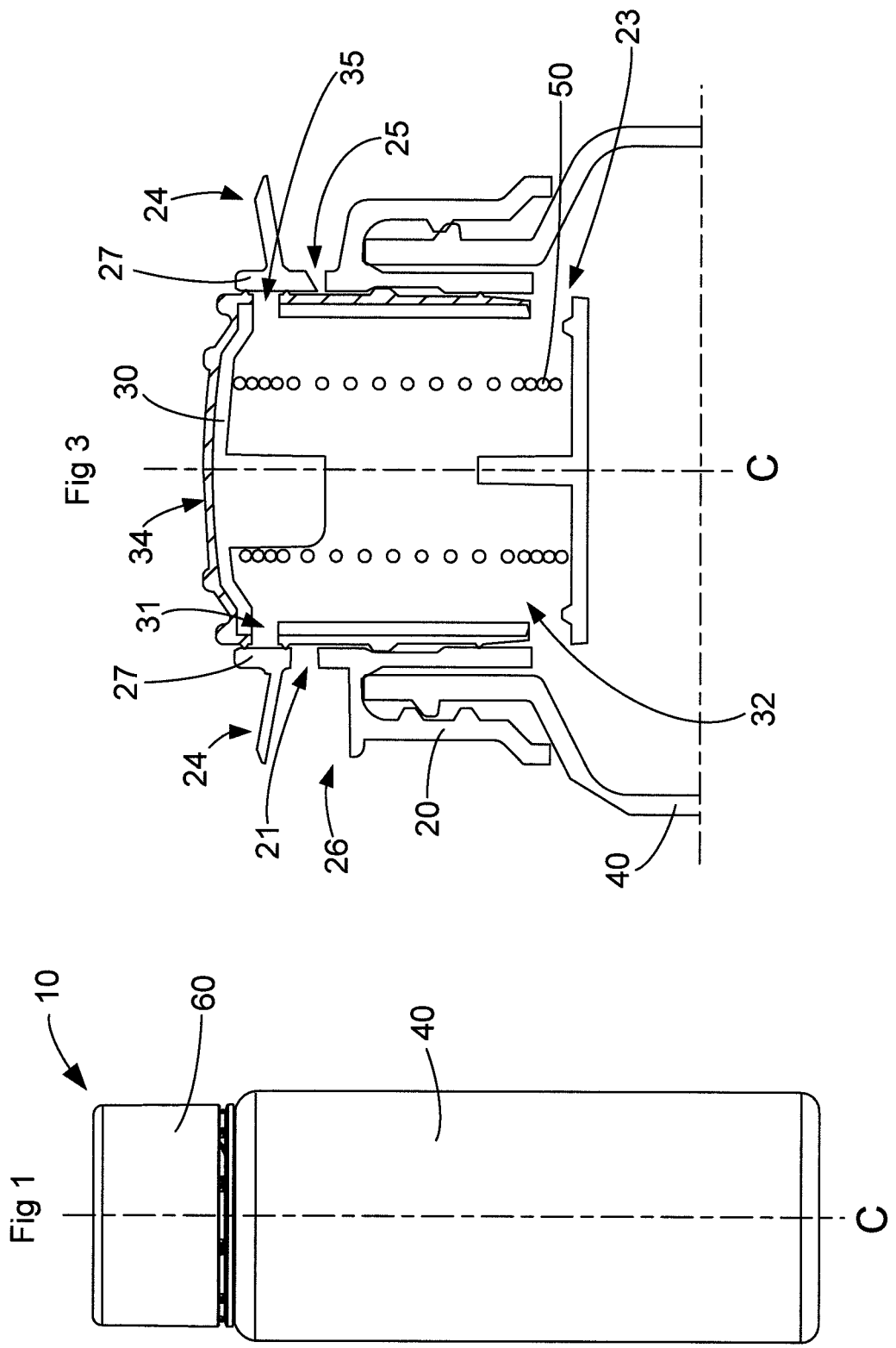

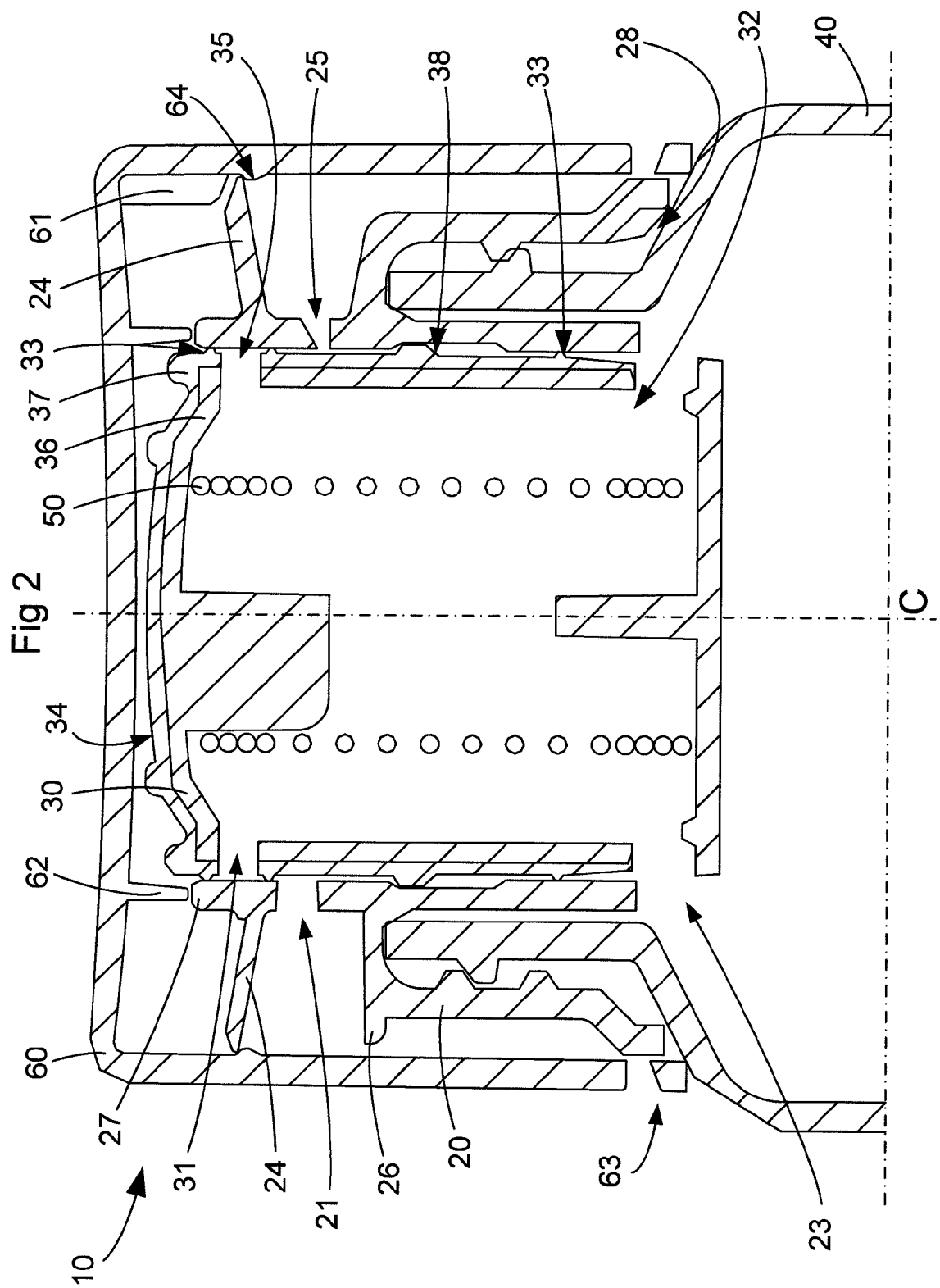

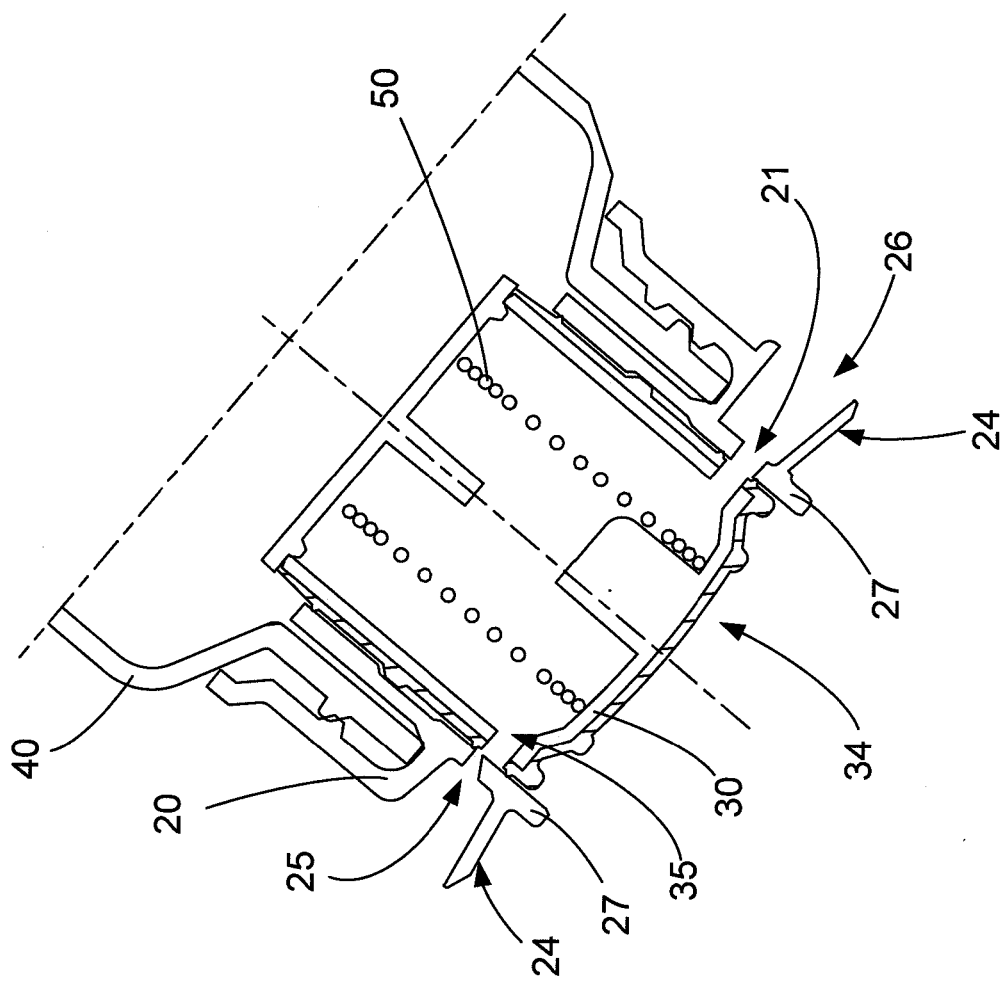
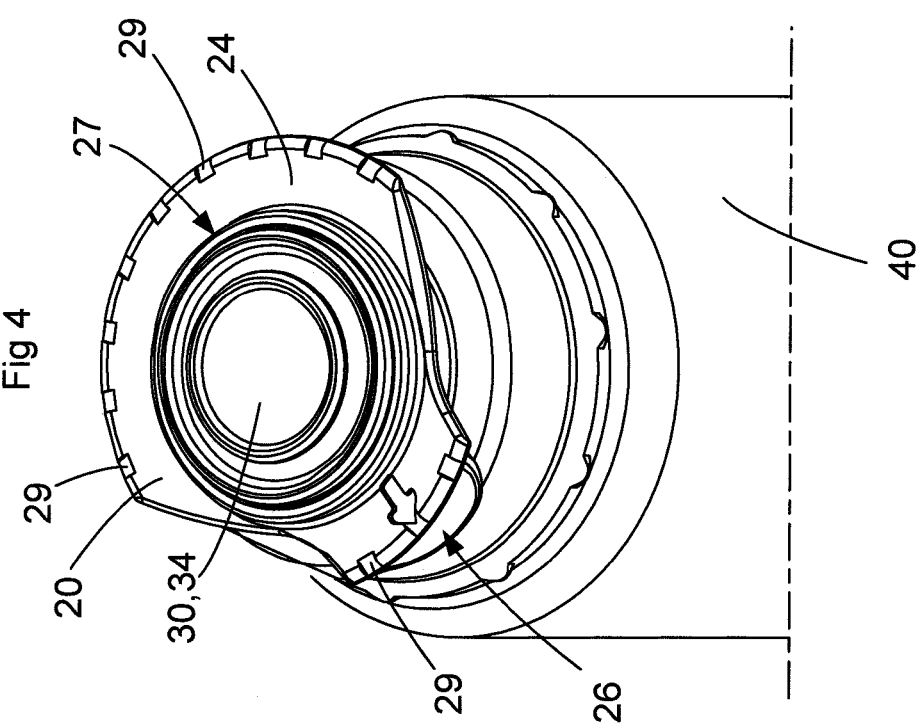

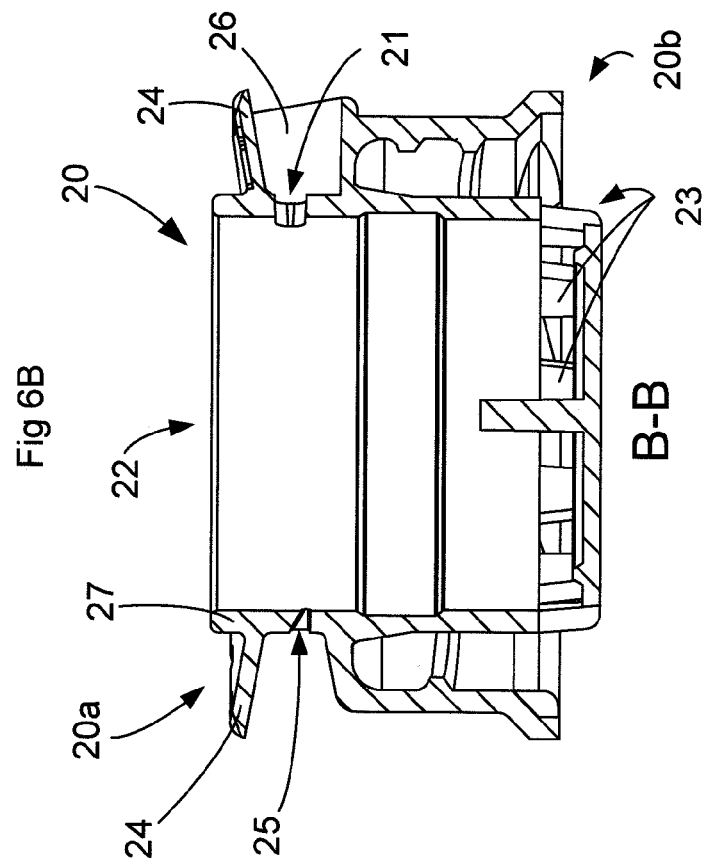
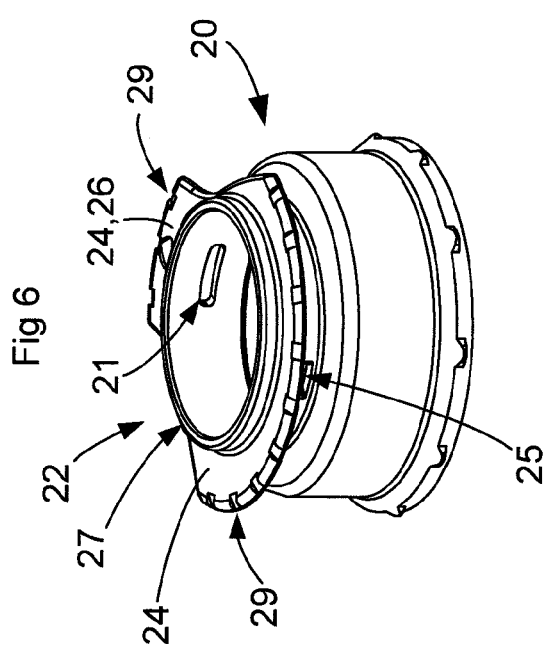
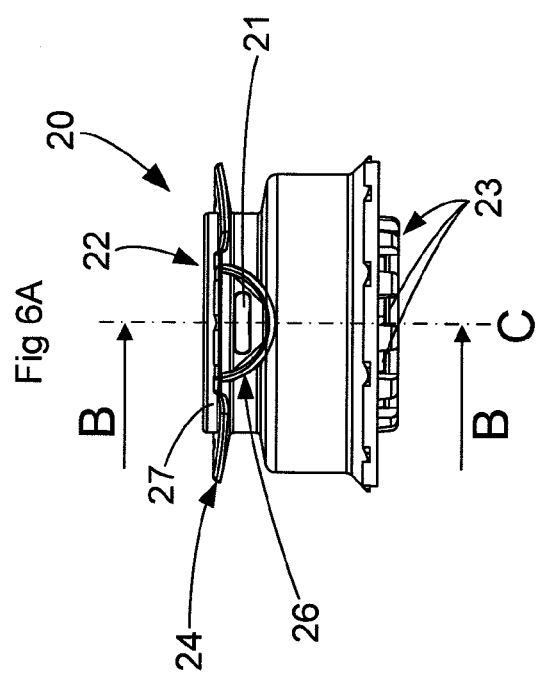

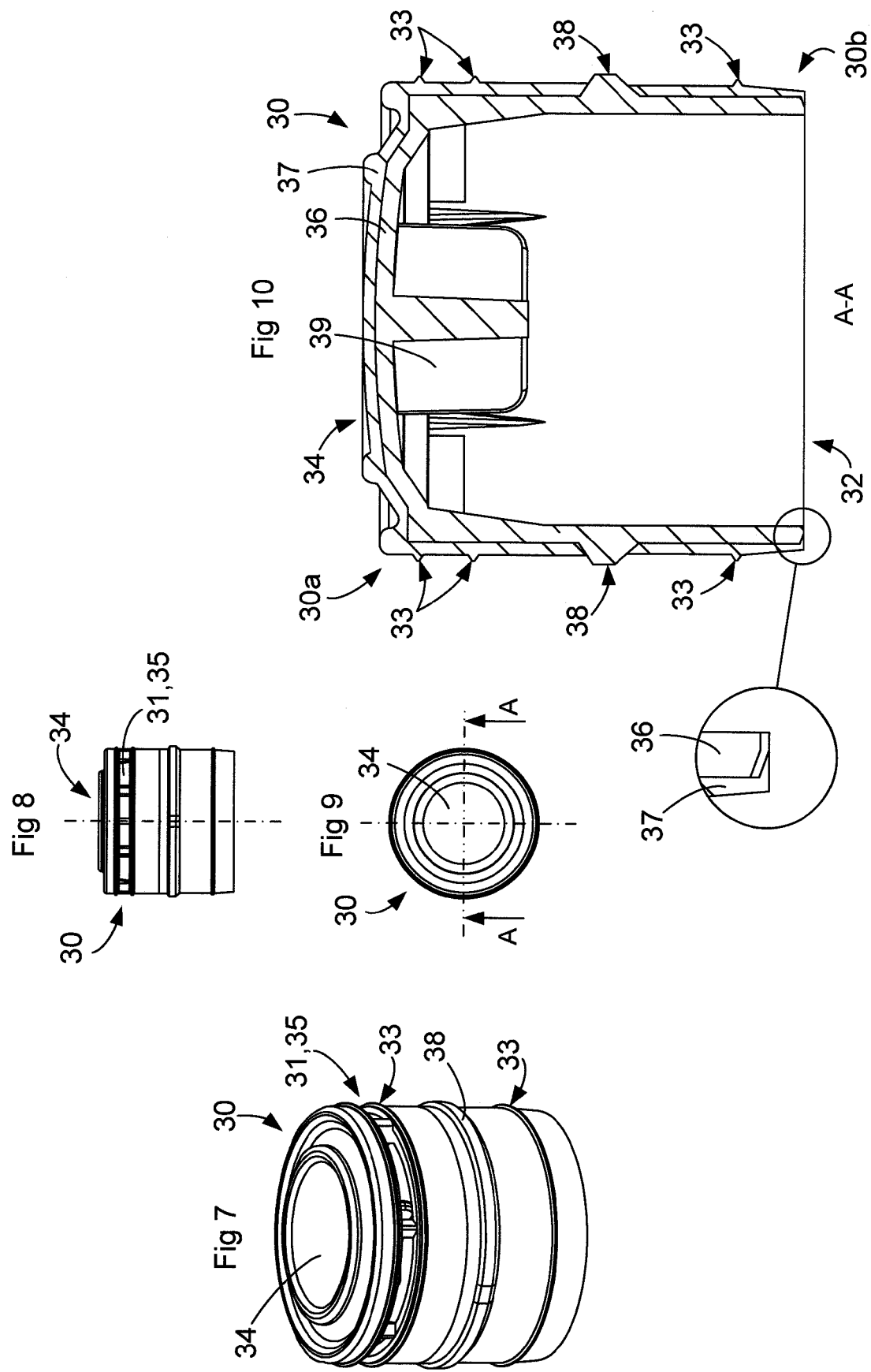

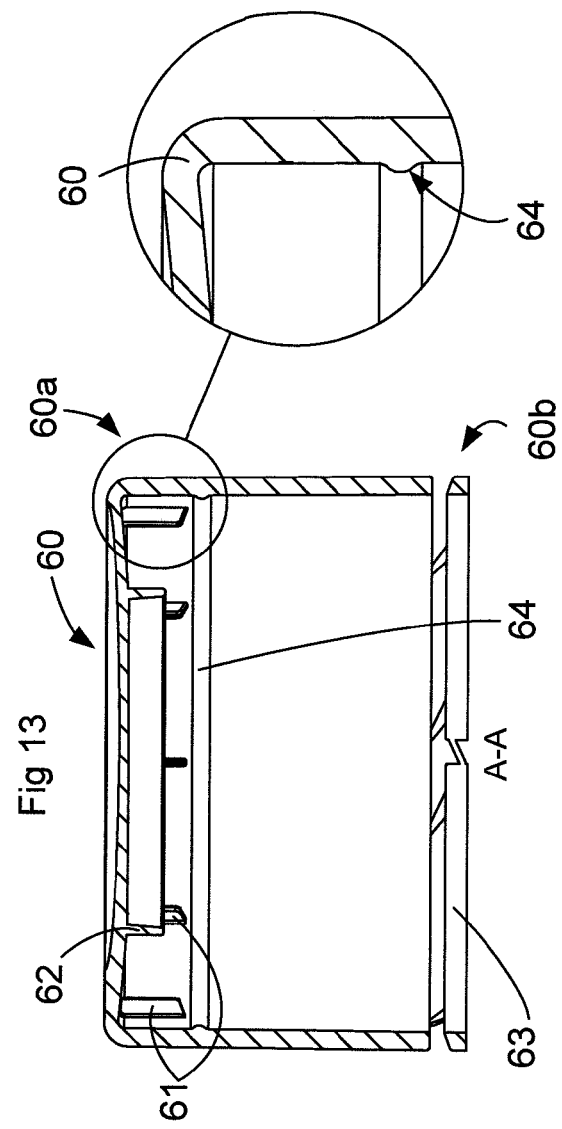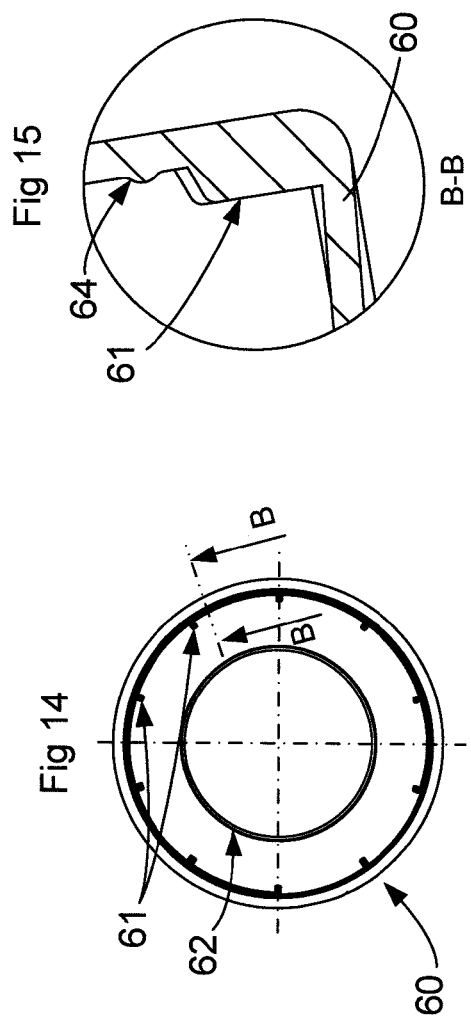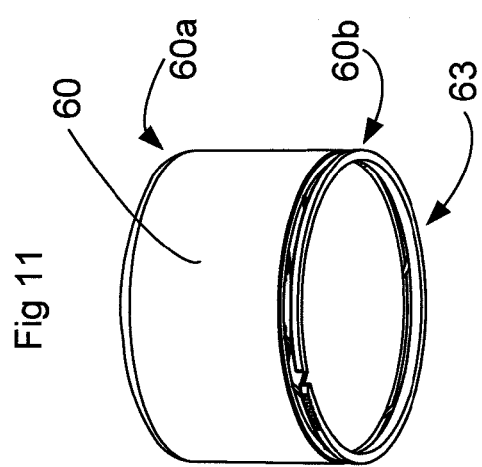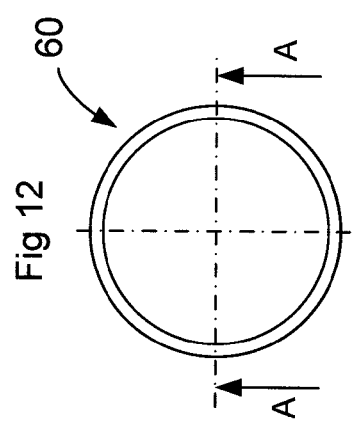

MEASURING DEVICE

TECHNICAL FIELD OF THE INVENTION

The present invention relates to a measuring device for measuring, measuring in, dosage, and discharging of fluids, liquids or powder from a container, with two functions, both fixed and optional, i.e. variable discharge of fluid.

DESCRIPTION OF RELATED ART

Commercial distribution and sale of viscous substances are as a rule performed with the substance in question contained in consumer-adapted containers in the shape of cans, jars, boxes, or bottles of different types. Most types of such containers are often in some way recloseable, e.g. by being provided with a lid for closing an opening in the container, or with a cap which can be tightly screwed to a threaded opening of the container and thereby sealing it. Different types of pourable substances that are packed in this way comprise beverages, oils, body and hair products, solvents, toners, powders, fluids for use in medical and dentist treatments, but also solid products such as vegetables and pharmaceutical pills. The fluids for usage in medical and dentist treatments are often measured in by means of caps with dosage devices or discharged into measuring cups manually before given to a patient.

A prior art dosage cap is disclosed in DE-A1-34 13 724, which cap has an inlet opening for filling a dosage chamber with fluid from a container by tilting it and an outlet opening for discharging and dosing of fluid from the dosage chamber by tilting and then pressing a biased actuator in the cap towards the container such that a piston sealing the outlet opening is moved out of the outlet opening, thereby opening it and the fluid is discharged in a direction being in parallel with the direction in which the actuator is moved. The actuator is sealed by an outer membrane to prevent leakage of fluid at the actuator. This prior art device has no air openings or protective cover and the fluid is discharged in the longitudinal direction of the container onto which it is detachably attached.

When using caps for discharge and/or dosage of different volumes from containers enclosing fluids or powders, especially in the medical and dentist field, the sealing of the fluid from the surrounding environment is essential, e.g. for eliminating leakage and to protect the fluid from any contamination, oxidation or degradation and to ensure that any tampering with the sealed container is detected and also more difficult to perform. The above described prior art has easy accessible sealings and one sealing for the outlet opening and a separate outer sealing, i.e. the membrane, for the actuator, whereby the sealing of the prior art device is easily tampered with while at the same time being complicated.

In the prior art dosage device, there is also a problem of leaking fluid, i.e. fluid leaking from the inside of the container to the outside. This is especially inconvenient when the container is filled with oil or oily fluids, whereby leakage of fluid soils the outside of the container making the container and its cap smeary. Moreover, the prior art dosage device discharges the fluid in a direction being parallel with and opposite to the push or press direction of the actuator. This means that the finger pressing the actuator may easily get splashed/hit by the fluid and soiled. Furthermore, the prior art dosage device comprises several components that are assembled together in a complicated way and provided with complicated non-symmetrical shapes meaning that the pressure distribution from the contained fluid is non-uniform giving rise to a high risk of leakage.

SUMMARY

An object of the present invention is to provide a dosing device capable of providing a more accurate measuring, an improved sealing, increased discharging and dosing rate, and easier handling compared to the prior art techniques. Furthermore, it is an object to provide a measuring device which can be used for various sorts of containers.

The invention is defined by the enclosed independent claims. Embodiments are set forth by the dependent claims attached and by the following description and the drawings.

According to the invention a measuring actuator for fixed and variable measuring of fluid in a container is provided, which actuator is configured for actuation by a finger and for detachable and movable sealing connection to a cap and adapted for sealing off fluid when in a non-actuated state and to discharge fluid when in an actuated state, the actuator comprising at least two openings, a discharge opening at a first substantially flat end and a fluid inflow opening at a second substantially flat end configured to face the container. The measurement actuator has a first sealing at the first actuator end around the discharge opening and a second sealing arranged closer to the fluid inflow opening, whereby each sealing extends continuously and circumferentially around the actuator in a plane being parallel with the ends of the actuator. The first sealing and the second sealing are adapted to be in constant sealing engagement with the cap, whereby the fluid is sealed off such that no leakage of fluid occurs in the non-actuated state and the actuated state.

In some embodiments of the above invention, each sealing is at least one continuous protrusion; the first sealing comprises two protrusions, a first sealing protrusion arranged closer to the first actuator end and a second sealing protrusion arranged closer to the second actuator end; the first sealing protrusion is adapted to be in constant sealing engagement with the cap while the second protrusion is adapted to move in and out of sealing engagement with the cap when the actuator is actuated; the second sealing at the second actuator end comprises one protrusion being adapted to be in constant sealing engagement with the cap when the actuator is actuated; the measuring actuator has a touch surface at the first end for actuation by means of the finger; the measuring actuator comprises at least one opening for air intake at the first actuator end; the air opening is arranged substantially opposite the discharge opening; the air opening is configured as cut-in portions evenly distributed circumferentially around the periphery of the actuator adjacent the first actuator end; the discharge opening and the air opening are parts of one and the same opening; each of the discharge opening and the air opening is a cut-in portion; the sealing protrusions at the first actuator end are arranged around the edge of the discharge opening; one sealing protrusion is arranged around the edge of the discharge opening which edge is closer to the first actuator end, and the other sealing protrusion is arranged around the other edge of the discharge opening, which other edge is closer to the second actuator end; the actuator comprises two different materials; the actuator comprises a core and an outer layer; the core is made of a rigid material; the outer layer is made of a non-rigid material; the core is made of a rigid plastic; the outer layer is made of a flexible or elastic material; the outer layer is made of a non-rigid plastic; the outer layer is a rubber-like material; the actuator has a substantially hollow cylindrical shape; and the first actuator end is closed and the second actuator end is open forming the fluid inflow opening.

The invention also concerns a measuring cap for fixed and variable measuring of fluid and configured for leak-proof and removable attachment to a container and detachable reception of a measuring actuator, the cap comprising at least three openings, a discharge opening and an actuator receiving opening at a first end and a fluid inflow opening at a second end being configured for leak-proof and removable attachment to the container. The measuring cap has at least one fluid catching edge at the first end, the fluid catching edge extending circumferentially around the cap in a plane being perpendicular to the centre axis of the cap and adapted to guide any leakage of fluid to the discharge opening, such that any leaking fluid joins the fluid coming out of the discharge opening.

In some embodiments of the above invention, the measuring cap comprises at least one opening for air intake at the first cap end; the cap air opening is arranged substantially opposite the cap discharge opening; the cap air opening is configured as a cut-in portion adjacent the first cap end; the cap air opening is arranged in alignment with the discharge opening; the cap air opening is arranged at a different distance from each cap end than the cap discharge opening; the cap air opening is arranged closer to the second cap end than the discharge opening; the cap discharge opening transcends into a fluid discharging spout; the spout extends radially from the cap; the cross section area of the cap spout increases in the discharge direction of the fluid; the fluid catching edge is a flange extending radially from the cap and circumferentially around the first cap end; the fluid catching flange is arranged at a distance from the first cap end such that a freely, in the longitudinal direction of the cap protruding end portion of this first cap end is formed; the fluid catching flange has a varying projecting length around the first cap end; the fluid catching flange has a substantially constant projecting length at the cap air opening and the cap discharge opening and a varying projecting length between these openings; the fluid catching flange protrudes with the constant projecting length around at least one quarter of the cap circumference at the cap air opening side and at least along the whole width of the cap discharge opening with a transcending varying length between these openings; and the fluid catching edge has recesses evenly distributed around its circumference such that a releasable engagement with a protective cover is achieved.

The invention also concerns a measuring unit for fixed and variable measuring of fluid and configured for leak-proof and removable attachment to a container, the unit comprising a cap, a measuring actuator operatively and detachably connected to the cap, and a spring for biasing the actuator. The cap is a cap according to any of the embodiments defined above, and the measuring actuator is a measuring actuator according to any of the embodiments defined above.

Moreover, the invention also concerns a cover for protecting the measuring unit and configured for leak-proof and removable attachment to a container and the measuring unit. The cover is substantially hollow for receiving the measuring unit and has a closed first end being adapted for covering the cap and an open second end being adapted for detachable guarantee closure against the measuring unit. The first cover end comprises protrusions evenly distributed around the inner circumference such that these protrusions are able to face the container and are in engagement with the measuring unit for enabling the transferring of torsional force between the cover and the measuring unit when the cover is attached to the measuring unit.

In some embodiments of the above invention, the cover is placed on a measuring unit that is a measuring unit according to the embodiment defined above; the first cover end comprises a protruding inner edge being adapted to bear against the measuring unit such that undesired discharging of fluid is prevented; the protruding edge bears against the freely longitudinally protruding end portion of the first cap end as defined in one embodiment above when the cover is attached to the measuring unit; and the cover is adapted for detachable guarantee closure against the container.

The invention also concerns a container for fixed and variable measuring of fluid, which comprises a measuring unit according to the embodiment defined above; and the container comprises a protective cover according to any of the embodiments defined above.

Furthermore, the invention also concerns a measuring device for fixed and variable measuring of fluid, which comprises a measuring unit according to the embodiment defined above and a protective cover according to any of the embodiments defined above.

Providing a container with a device for measuring and discharging fluid or powders according to the invention makes the measuring and discharging of fluids or powders leak-proof, and less complicated with few components to be assembled and work together. The inventive components makes the device according to the invention easier to handle, manufacture, assemble and store as a spare part reducing, consequently, costs associated therewith. Moreover, the invention provides a clean handling by eliminating the leakage of fluid, i.e. the invention prevents fluid from being mislead and from contacting the finger actuating the discharge of the fluid. Furthermore, the invention provides a measuring device with short strokes and wide openings for discharge of fluid such that shorter emptying times and simpler, faster and safer handling are achieved, i.e. the invention minimizes the risk of handling errors, and also enhances the reliability and endurance of the measuring device.

The invention also provides an integrated sealing in measuring devices such that no additional, external or separate sealing material or components are required, i.e. the sealing function is integrated in the actuator of the measuring device.

BRIEF DESCRIPTION OF THE DRAWINGS

The measuring/dosage device will now be described in more detail with reference to the drawings enclosed, in which FIG. 1 is a view of an exemplary container with a measuring device according to the invention mounted thereon before use, FIG. 2 is a sectional view of the measuring device in FIG. 1, FIG. 3 is a sectional view of the measuring device in FIG. 2 with a protective cover according to the invention detached, FIG. 4 is a perspective view of the measuring device in FIG. 3, FIG. 5 is a sectional side view of the measuring device of FIG. 3 in use, FIG. 6 is a perspective view of a cap of the measuring device in FIG. 3 when dismounted from the device, FIG. 6A is a front view of the cap in FIG. 6, FIG. 6B is a sectional view of cap in FIGS. 6-6A, FIG. 7 is a perspective view of an actuator of the measuring device in FIGS. 2 to 5 when dismounted from the device, FIG. 8 is a front view of the actuator in FIG. 7, FIG. 9 is a view from above of the actuator in FIG. 7, FIG. 10 is a sectional side view of the actuator in FIG. 7, FIG. 11 is a perspective view of a cover of the measuring device in FIGS. 1 and 2 when dismounted from the device, FIG. 12 is a view from above of the cover in FIG. 11, FIG. 13 is a sectional side view of the cover in FIG. 12, FIG. 14 is a view from below of the cover in FIG. 11, and FIG. 15 is a sectional side view of a part of the cover in FIG. 14.

DETAILED DESCRIPTION OF EMBODIMENTS

FIG. 1 discloses a measuring and dosage device 10 according to the invention and an inventive protective cover 60 mounted onto a container 40. The measuring device 10 according to the invention shown in FIG. 2 comprises an inventive cap 20 (shown in detail in FIGS. 6-6B), an inventive measuring actuator 30 (shown in detail in FIGS. 7-10), a spring 50 for biasing the actuator inside the cap away from the container, and the protective cover 60 (shown in detail in FIGS. 11-15). The measuring actuator 30 is removably and movably received in the cap 20. Each of the components of the measuring device 10 is substantially hollow with a substantially rounded shape, preferably cylindrical shape, but may of course have any other suitable shape, e.g. a square or triangular shape, even though a rounded symmetrical shape is preferred in regard of a more uniform pressure distribution and minimization of fluid leakage, i.e. a rounded shape enhances the sealing and the distribution of pressure from the contained fluid in the container 40, e.g. an oval cross-section.

Cap:

The cap 20 comprises a first open end 20a facing away from the container when the cap is detachably and leak-proof mounted thereto at a second end 20b. Embodiments of the cap 20 comprises at least one discharge opening 21, an actuator receiving opening 22, at least one fluid inflow opening 23, at least one fluid catching edge 24 extending circumferentially around the cap end 20a at a distance from the actuator receiving opening 22, at least one air intake opening 25, at least one fluid discharge spout 26 at the discharge opening 21, i.e. the discharge opening may transcend into the spout, and a free end portion 27 protruding in the longitudinal direction of the cap and forming part of the actuator receiving opening 22. The free protruding end portion 27 is formed in that the fluid catching edge 24 is arranged at a distance from the actuator receiving opening 22. The second cap end 20b is leak-proof, tamper detectably, and removably attached to the container 40 at its neck by means of a guarantee seal 28 and a thread coupling.

The measuring cap 20 according to the invention (see FIGS. 2-6B) comprises at least three openings, i.e. the discharge opening 21, the actuator receiving opening 22 and the fluid inflow opening 23. The fluid catching edge 24 at the first end 20a extends circumferentially around the actuator 30 in a plane being perpendicular to a centre axis C of the cap and is adapted to guide any leakage of fluid to the discharge opening 21, such that any leaking fluid joins the fluid coming out of the discharge opening. The centre axis C is common for all the components according to the invention, and also the container 40. The fluid catching edge 24 extends obliquely, i.e. it protrudes out from the cap 20 substantially radially but with an angle, i.e. the edge 24 extends not perpendicularly in relation to the centre axis C of the cap as seen in FIGS. 2-3, and 5-6B, wherein the angle between the upper surface of the edge, i.e. the edge surface facing away from the container and upwards in FIGS. 2-4, and 6-6B, and the cap centre axis is less than 90°, such that when the container and the measuring device 10 as seen in FIG. 5 is turned almost upside-down, i.e. tilted for discharge of fluid for dosage thereof, the shape of the fluid catching edge guides any fluid leaking from the cap air opening 25 to the cap discharging spout 26.

Each opening 25 for air intake at the first cap end 20a may be arranged substantially opposite the cap discharge opening 21, and may, in another embodiment, be configured as one or more cut-in portions adjacent this first cap end. Moreover, the cap 20 has a thread member for removable engagement with the neck of the container 40, this is a known way of attaching a cap to a container and will therefore not be explained in detail. The cap air opening 25 has a triangular or conical cross-section as seen in FIG. 6B while the fluid discharge opening 21 has an essentially square but conical cross-section. The cap air opening may in one embodiment be arranged in alignment with the discharge opening 21, i.e. be arranged in the same plane being perpendicular to the centre axis C of the cap and at the same distance from each cap end 20a, 20b, and may also be arranged at a distance from each cap end being different from the distance at which the discharge opening is arranged. The cap air opening 25 may be arranged closer to the second cap end 20b than the discharge opening 21, but could also be arranged closer to the first cap end 20a, even though the other positions are preferred. The openings 21 and 25 are rounded for "smoothing" the outflow of fluid and the inflow of air, respectively.

In FIGS. 2-6B, the spout 26 extends radially from the cap 20. The cross-section area of the cap spout increases in the discharge direction of the fluid. The spout has a substantially straight in the tangential direction for the cap extending upper edge, which edge extends in the radial direction of the cap 20 obliquely and a rounded lower edge as shown in FIG. 6A for guiding the fluid. The spout 26 has a substantially semi-circular cross-section when viewed from the front in FIG. 6A.

The fluid catching edge 24 is a flange extending radially from the cap 20 and circumferentially around the first cap end 20a. The fluid catching flange 24 has a varying projecting length around the first cap end. The fluid catching flange has a substantially constant projecting length at the cap air opening 25 and the cap discharge opening 21 and a varying projecting length between these openings. The fluid catching flange may protrude with the constant projecting length around at least one quarter of the cap circumference at the cap air opening 25 side and at least along the whole width of the cap discharge opening 21 with a transcending varying length between these openings 25, 21. In one embodiment, the fluid catching edge 24 has recesses or indentations 29 evenly distributed around its circumference such that an optional and releasable engagement with the protective cover 60 is achieved when the cover is pressed onto the cap. This is achieved in that the indentations 29 face away from the container 40 upwards towards the cover 60 such that these indentations are able to be engaged by protrusions 61 inside the cover fitting into the indentations creating torsional interconnection of the cover and the cap 20.

The cap 20 has the second cap end 20b closed with a wall forming a bottom against which the actuator 30 touches such that a closed volume is achieved when the actuator is pressed as far as possible into the cap. By pressing the actuator until it contacts the bottom of the cap 20 the fixed volume or dosage state is achieved in that a fixed volume of fluid to be measured in is cut off from communication with the remaining fluid in the container 40. The fluid inflow openings 23 are arranged at the corner areas of the second end 20b as seen in FIGS. 2, 3, 5, 6A, and 6B, and are configured as cut-in portions extending only along the sides of this cap end, whereby the openings only form part of the cap sides and not the cap bottom, i.e. the actuator 30 is in sealing contact with the cap bottom around its whole free edge 30b closing off the cap openings 23 when pushed down all the way to the bottom of the cap. In the other discharging state, i.e. the variable and optional measuring state (not shown), the actuator 30 is not pushed all the way down to the cap bottom, instead it is stopped and held at an intermediate level between the non-actuated state (FIGS. 2, 3) and the "bottom" state (FIG. 5), such that a free or open communication is achieved between the aligned discharge openings 21 and 31 and the inflow openings 23 and fluid may freely flow from the container 40, through the cap inflow openings and to the discharge openings and out via the spout 26. This means that the actuator is pressed towards the container 40 until the cap discharge opening 21 and the actuator discharge opening 31 coincide but is stopped before the actuator hits the cap bottom. In this state, the user manually controls the dosing and may, whenever the user finds it appropriate, stop pushing or release the actuator 30, and the spring 50 presses the actuator back to the non-actuated and non-discharging state sealing off the fluid, as shown in FIGS. 2 and 3.

The cap air opening 25 is preferably arranged closer to the container 40 than the cap fluid discharge opening 21, such that firstly a pressure is built up inside the actuator 30 filled with fluid and the discharge opening 21 is opened before the air opening when pressing the actuator and that the first splash, squirt or drops of fluid are discharged into the spout 26 and not the air opening 25. This arrangement of the openings 21 and 25 at different levels in relation to each other enhances the control and guiding of this first squirt of fluid compared to prior art. This means that the air opening placed closer to the container is preferred but that an air opening arranged opposite and in alignment with the discharge opening 21 works fine but does not give the same advantages as the preferred embodiment.

Furthermore, the cap 20 has an inner protrusion on the bottom, which protrusion has a diameter smaller than the inner diameter of the actuator opening 32 such that when the actuator opening hits the cap bottom, the cap bottom protrusion enhances the guiding of the actuator opening laterally for improving the sealing between the cap bottom and the actuator 30.

Actuator:

The actuator 30 according to the invention is shown in detail in FIGS. 7-10 and embodiments of the actuator comprises a first closed end 30a comprising a fluid discharge opening 31 extending in the radial direction of the actuator and the container 40 for cooperation with the cap fluid discharge opening 21 when actuated, a fluid inflow opening 32 at an open second end 30b for cooperation with the cap fluid inflow opening 23 and for closing off the fluid inflow when pushed to the bottom of the cap 20, i.e. in the fixed volume or dosage state, sealings 33 extending circumferentially around the outer surface of the actuator at each end 30a, 30b and adapted to sealingly contact the inner cap surface, a touch surface 34 at the first end 30a forming the closure thereof and facing outwards, and an air intake opening 35 for cooperation with the cap air opening 25 when the actuator is actuated. The actuator is made of a core 36 and an outer layer 37. When mounting the actuator 30 detachably to the cap 20 the actuator is introduced through the cap opening 22 in a cap cavity and snap-fitted to a recess on the inside of the cap by means of a connecting member 38 arranged externally of the actuator and extending around the circumference of the actuator and working as guidance and stop in both directions for the actuator when moving up and down inside the cap on the inside of the cap 20 when actuating the actuator 30, i.e. operating it, and to keep it in place when not actuated.

Each sealing 33 of the actuator 30 is at least one continuous protrusion, whereby a first sealing 33 at the first actuator end 30a comprises two protrusions, and a second sealing 33 at the second actuator end 30b comprises one protrusion. Each sealing protrusion 33 extends along the whole actuator circumference.

The measurement actuator 30 has the touch surface 34 for actuation by means of a finger at the first end 30a, and the measurement actuator comprises at least one opening 35 for air intake at the first actuator end. The air opening 35 is arranged substantially opposite the discharge opening 31, and, in one embodiment, the air opening is configured as cut-in portions evenly distributed circumferentially around the periphery of the actuator 30 adjacent its first end 30a, i.e. the actuator is fenestrated with openings forming a coarse-meshed net or grid. In another embodiment, the discharge opening 31 and the air opening 35 are parts of one and the same opening and arranged in the same plane, and, in yet another embodiment, each of the discharge opening 31 and the air opening 35 is separate cut-in portions, and may also be placed in different planes or at different levels. The preferred embodiment has the actuator openings 31 and 35 in the same plane and aligned with each other and distributed uniformly around the whole circumference of the actuator 30, while in other embodiments, the openings 31, 35 may not form part of the same opening. The actuator openings 31, 35 do not have to be evenly distributed around the whole actuator circumference, instead the openings may only be distributed at a part of the circumference, i.e. the essential criteria is that the openings 31, 35 are sufficiently wide or a sufficient number of openings such that if the actuator 30 is rotated accidentally around its centre axis inside the cap 20, at least a part of both openings or at least one opening of each discharge or air opening is not closed off such that fluid may flow there through if necessary.

The measuring actuator 30 comprises the sealing protrusions 33 at the first actuator end 30a of which one sealing protrusion is arranged around the edge of the discharge opening 31, which edge is closer to the first actuator end 30a, and the other sealing protrusion 33 is arranged around the other edge of the discharge opening 31, which other edge is closer to the second actuator end 30b. The sealing protrusion 33 at the second actuator end 30b is placed nearest to this second end compared to the other two sealing protrusions.

The actuator 30 is made of two different materials, wherein the actuator core 36 is made of a rigid and/or hard material, and the outer actuator layer 37 is made of a non-rigid material, a soft material, a flexible material, an elastic material, a non-rigid plastic, or a material comprising rubber, or any combination of any of these materials to fulfil the requirements according to the invention.

The actuator 30 has a substantially hollow cylindrical shape. The second actuator end 30b is open forming the fluid inflow opening 32. The at least one outer connecting member 38 extends circumferentially around the actuator in a plane being perpendicular to the direction of movement of the actuator. The connecting member 38 is formed by a combination of the core 36 and the external layer 37 as an intermittent protrusion on the core 36, which interruptions are filled up by the softer outer layer 37.

The actuator 30 has guiding means 39 in the form of an inner protrusion with a triangular cross-section for guiding and holding the spring 50 laterally. The spring guide 39 extends from the inside of the core 36 opposite the touch surface 34 towards the container 40 and the cap 20 when mounted thereto to keep the spring 50 in place and to enhance the reliability of the actuator function.

The first sealing 33 at the first actuator end 30a comprises the two protrusions, a first sealing protrusion arranged closer to the first actuator end 30a and a second sealing protrusion arranged closer to the second actuator end 30b as the discharge opening 31 has one edge closer to the first actuator end 30a and the other edge closer to the second actuator end 30b. The first sealing protrusion at the first actuator end 30a is adapted to be in constant sealing engagement with the inside of the cap 20 while the second protrusion at the first actuator end 30a is adapted to move in and out of sealing engagement with the cap when the actuator is actuated, i.e. this second protrusion 33 is passed over or "jumps" over the discharge opening from a first position (the non-actuated state) above the opening as shown in FIGS. 2 and 3, and to a second position (the bottoming state) "below" the opening 31 as shown in FIG. 5. This means that the outer sealing protrusions, i.e. the first sealing protrusion at the first actuator end 30a and the sealing protrusion nearest the second actuator end 30b are in constant sealing engagement with the cap 20, both when the actuator is not actuated and when it is actuated.

Measuring Unit:

A measuring unit 10 according to the invention for fixed and variable measuring of fluid comprises the cap 20, the measuring actuator 30, and the spring 50 assembled as a unit, which unit is configured for leak-proof and removable attachment to the container 40 This unit may be stored as a spare part and by dimensioning the cap and the actuator with different sizes and shapes, one unit for each different fixed dosage volume can be used and attached to different containers if the different units have the same type of coupling for each container. Moreover, an existing measuring unit adapted for one volume, e.g. 10 ml, may then easily be replaced by another unit for another volume, i.e. a larger or smaller dose, e.g. 5 ml or 15 ml, or any other suitable dosage. In order to distinguish different measuring units, the units and/or the components forming the unit, i.e. the cap 20, and the actuator 30, may also have differing colours for different volumes.

Cover:

A cover 60 according to the invention is shown in detail in FIGS. 11-15 for protecting the measuring unit 10 is configured for leak-proof and removable attachment to the container 40 and/or the measuring unit. The cover 60 is substantially hollow for receiving the measuring unit 10 and has a closed first end 60a being adapted for detachably covering the cap 20 and an open second end 60b being adapted for guarantee closure 63 against the container 40 in one embodiment, against the cap 20 in another embodiment, and against both the container and the cap in yet another embodiment. The first cover end 60a comprises the protrusions 61 evenly distributed around the inner circumference at the corner areas such that these wall-like protrusions are able to engage the indentations 29 of the cap 20 in the measuring unit 10 for enabling the transferring of torsional force between the cover 60 and the cap when the cover is attached to the measuring unit. The first cover end 60a comprises a protruding inner edge 62 being adapted to bear against the cap 20, i.e. its protruding free edge 27. This edge 62 is formed and works as an inner spacer ring, which is adapted to bear against the cap edge 27 as the diameters of these edges correspond and that they face each other, such that the discharging of fluid can not be done unintentionally by pushing/pressing on the cover 60 such that it in turn presses on the actuator 30 when the cover is attached to the cap 20 as the cover then instead pushes against the cap edge 27.

The cover 60 according to the invention comprises an inner circumferential protrusion 64 at a distance from the first cover end 60a for engagement with the cap edge 24, i.e. when the cover is put over the cap 20, the cover is pushed towards the container 40 and the cap 20 with a certain force onto the cap, so that the protrusion 64 snaps on and over the cap flange 24. This makes the cover 60 a snap-on lid on the cap that may be disassembled by pulling with force in a direction opposite the mounting direction, whereby the cover protrusion snaps out of engagement while passing the cap flange 24 and is loosened together with the guarantee closure 63 in a known way.

In the shown embodiment, the cap 20 is mounted by rotation into threaded engagement with the container 40, i.e. its opening and neck, i.e. the container neck. However, it could of course also be advantageous to use the present invention on a push- or press-cap container design, suitable for a capping device where a chuck is arranged for example to push the capsule onto the container opening. A person skilled in the art also realises that the container on to which the cap is mounted is not necessarily a complete container, but alternatively only that part of the container on to which the container opening is formed, e.g. a bottle neck. The invention has been described by means of examples directed to measuring devices comprising caps detachably mounted onto necks of containers. It should be noted, though, that in some cases measuring devices with caps are mounted to container necks before the container neck is attached to the actual container, by welding or gluing, or any other suitable method.

Moreover, the different dosing units 10 for each different constant dosing volume may also require differently sized and shaped covers 60 for mounting thereon, whereby different measuring devices are achieved for different dosing volumes.

The invention claimed is:

1. A measuring actuator for fixed and variable measuring of fluid in a container, wherein the actuator is configured for actuation by a finger and for detachable and movable sealing connection to a cap and adapted for sealing off fluid when in a non-actuated state and to discharge the fluid when in an actuated state, the actuator comprising at least two openings, a discharge opening at a first substantially flat end and a fluid inflow opening at a second substantially flat end configured to face the container, wherein the measuring actuator has a first sealing at the first actuator end around the discharge opening and a second sealing arranged closer to the fluid inflow opening, whereby each sealing extends continuously and circumferentially around the actuator in a plane being parallel with the ends of the actuator, and the first sealing and the second sealing are adapted to be in constant sealing engagement with the cap, whereby the fluid is sealed off such that no leakage of fluid occurs in the non-actuated state and the actuated state, wherein each sealing is at least one continuous protrusion,
wherein the first sealing comprises two protrusions, a first sealing protrusion arranged closer to the first actuator end and a second sealing protrusion arranged closer to the second actuator end.

2. A measuring actuator according to claim 1, wherein the first sealing protrusion is adapted to be in constant sealing engagement with the cap while the second protrusion is adapted to move in and out of sealing engagement with the cap when the actuator is actuated.

3. A measuring actuator according to claim 2, wherein the second sealing at the second actuator end comprises one protrusion being adapted to be in constant sealing engagement with the cap when the actuator is actuated.

4. A measuring actuator according to claim 1, wherein the measuring actuator has a touch surface at the first end for actuation by means of the finger.

5. A measuring actuator according to claim 1, wherein the measuring actuator comprises at least one opening for air intake at the first actuator end.

6. A measuring actuator according to claim 5, wherein the air opening is arranged substantially opposite the discharge opening.

7. A measuring actuator according to claim 5, wherein the air opening is configured as cut-in portions evenly distributed circumferentially around the periphery of the actuator adjacent the first actuator end.

8. A measuring actuator according to claim 7, wherein the discharge opening and the air opening are parts of one and the same opening.

9. A measuring actuator according to claim 7, wherein each of the discharge opening and the air opening is a cut-in portion.

10. A measuring actuator according to claim 1, wherein the sealing protrusions at the first actuator end are arranged around the edge of the discharge opening.

11. A measuring actuator according to claim 10, wherein one sealing protrusion is arranged around the edge of the discharge opening, wherein the edge around which the one sealing protrusion is around is the edge that is closer to the first actuator end, and the other sealing protrusion is arranged around the other edge of the discharge opening, which other edge is closer to the second actuator end.

12. A measuring actuator according to claim 1, wherein the actuator comprises two different materials.

13. A measuring actuator according to claim 1, wherein the actuator comprises a core and an outer layer.

14. A measuring actuator according to claim 13, wherein the core is made of a rigid material.

15. A measuring actuator according to claim 13, wherein the outer layer is made of a non-rigid material.

16. A measuring actuator according to claim 14, wherein the core is made of a rigid plastic.

17. A measuring actuator according to claim 15, wherein the outer layer is made of a flexible or elastic material.

18. A measuring actuator according to claim 15, wherein the outer layer is made of a non-rigid plastic.

19. A measuring actuator according to claim 15, wherein the outer layer is a rubber-like material.

20. A measuring actuator according to claim 1, wherein the first actuator end is closed and the second actuator end is open forming the fluid inflow opening.

21. A measuring actuator according to claim 3, wherein the measurement actuator comprises at least one opening for air intake at the first actuator end.

22. A measuring cap for fixed and variable measuring of fluid, wherein the cap is configured for leak-proof and removable attachment to a container and detachable reception of a measuring actuator, the cap comprising at least three openings, a discharge opening and an actuator receiving opening at a first end and a fluid inflow opening at a second end being configured for leak-proof and removable attachment to the container, wherein the measuring cap has at least one fluid catching edge at the first end, the fluid catching edge extending circumferentially around the cap in a plane being perpendicular to the centre axis of the cap and adapted to guide any leakage of fluid to the discharge opening, such that any leaking fluid joins the fluid coming out of the discharge opening in a discharge direction, and the measuring cap has at least one spout extending radially from the cap, whereby the cross-section area of the at least one spout of the cap increases in the discharge direction of the fluid.

23. A measuring cap according to claim 22, wherein the measuring cap comprises at least one cap air opening for air intake at the first end.

24. A measuring cap according to claim 23, wherein the cap air opening is arranged substantially opposite the discharge opening.

25. A measuring cap according to claim 23, wherein the cap air opening is configured as a cut-in portion adjacent the first end.

26. A measuring cap according to claim 23, wherein the cap air opening is arranged in alignment with the discharge opening.

27. A measuring cap according to claim 23, wherein the cap air opening is arranged at a different distance from each end than the discharge opening.

28. A measuring cap according to claim 27, wherein the cap air opening is arranged closer to the second end than the discharge opening.

29. A measuring cap according to claim 22, wherein the fluid catching edge is a flange extending radially from the cap and circumferentially around the first end.

30. A measuring cap according to claim 22, wherein the fluid catching edge is arranged at a distance from the first end such that a freely, in the longitudinal direction of the cap protruding end portion of the first end is formed.

31. A measuring cap according to claim 22, wherein the fluid catching edge has a varying projecting length around the first end.

32. A measuring cap according to claim 31, wherein the fluid catching edge has a substantially constant projecting length at the cap air opening and the discharge opening and a varying projecting length between these openings.

33. A measuring cap according to claim 32, wherein the fluid catching edge protrudes with the constant projecting length around at least one quarter of the cap circumference at the cap air opening side and at least along the whole width of the discharge opening with a transcending varying length between these openings.

34. A measuring cap according to claim 22, wherein the fluid catching edge has recesses evenly distributed around its circumference such that a releasable engagement with a protective cover is achieved.

35. A measuring cap according to claim 23, wherein the cap air opening is arranged in alignment with the discharge opening.

36. A measuring cap according to claim 23, wherein the cap air opening is arranged at a different distance from each cap end than the discharge opening.

37. A measuring unit for fixed and variable measuring of fluid, wherein the measuring unit is configured for leak-proof and removable attachment to a container, the unit comprising a cap, a measuring actuator operatively and detachably connected to the cap, and a spring for biasing the actuator, wherein the cap is a measuring cap for fixed and variable measuring of fluid, wherein the cap is configured for leak-proof and removable attachment to a container and detachable reception of a measuring actuator, the cap comprising at least three openings, a discharge opening and an actuator receiving opening at a first end and a fluid inflow opening at a second end being configured for leak-proof and removable attachment to the container, and wherein the measuring cap has at least one fluid catching edge at the first end, the fluid catching edge extending circumferentially around the cap in a plane being perpendicular to the centre axis of the cap and adapted to guide any leakage of fluid to the discharge opening, such that any leaking fluid joins the fluid coming out of the discharge opening, and the measuring actuator comprises a measuring actuator for fixed and variable measuring of fluid in a container, wherein the actuator is configured for actuation by a finger and for detachable and movable sealing connection to a cap and adapted for sealing off fluid when in a non-actuated state and to discharge fluid when in an actuated state, the actuator comprising at least two openings, a discharge opening at a first substantially flat end and a fluid inflow opening at a second substantially flat end configured to face the container, wherein the measuring actuator has a first sealing at the first actuator end around the discharge opening and a second sealing arranged closer to the fluid inflow opening, whereby each sealing extends continuously and circumferentially around the actuator in a plane being parallel with the ends of the actuator, and the first sealing and the second sealing are adapted to be in constant sealing engagement with the cap, whereby the fluid is sealed off such that no leakage of fluid occurs in the non-actuated state and the actuated state, wherein each sealing is at least one continuous protrusion, and wherein the first sealing comprises two protrusions, a first sealing protrusion arranged closer to the first actuator end and a second sealing protrusion arranged closer to the second actuator end.

38. A cover for protecting a measuring unit for fixed and variable measuring of fluid, wherein the cover is configured for leak-proof and removable attachment to a container and the measuring unit, wherein the measuring unit is a measuring unit according to claim 37, and wherein the cover is substantially hollow for receiving the measuring unit and has a closed first end being adapted for covering the cap and an open second end being adapted for detachable guarantee closure against the measuring unit, and wherein the closed first end comprises protrusions evenly distributed around the inner circumference such that these protrusions are able to face the container and are in engagement with the measuring unit for enabling the transferring of torsional force between the cover and the measuring unit when the cover is attached to the measuring unit.

39. A container for fixed and variable measuring of fluid, wherein the container comprises a measuring unit according to claim 37.

40. A container according to claim 39, wherein the container comprises a protective cover for protecting a measuring unit for fixed and variable measuring of fluid, wherein the cover is configured for leak-proof and removable attachment to the container and the measuring unit, wherein the cover is substantially hollow for receiving the measuring unit and has a closed first end being adapted for covering the cap and an open second end being adapted for detachable guarantee closure against the measuring unit, and wherein the closed first end comprises protrusions evenly distributed around the inner circumference such that said protrusions are able to face the container and are in engagement with the measuring unit for enabling transferring of torsional force between the cover and the measuring unit when the cover is attached to the measuring unit.

41. A measuring device for fixed and variable measuring of fluid, wherein the measuring device comprises a measuring unit according to claim 37 and a protective cover for protecting a measuring unit for fixed and variable measuring of fluid, wherein the cover is configured for leak-proof and removable attachment to a container and the measuring unit, wherein the cover is substantially hollow for receiving the measuring unit and has a closed first end being adapted for covering the cap and an open second end being adapted for detachable guarantee closure against the measuring unit, and wherein the closed first end comprises protrusions evenly distributed around the inner circumference such that said protrusions are able to face the container and are in engagement with the measuring unit for enabling transferring of torsional force between the cover and the measuring unit when the cover is attached to the measuring unit.

42. A cover for protecting a measuring unit for fixed and variable measuring of fluid, wherein the cover is configured for leak-proof and removable attachment to a container and the measuring unit, wherein the cover is substantially hollow for receiving the measuring unit and has a closed first end being adapted for covering the cap and an open second end being adapted for detachable guarantee closure against the measuring unit, wherein the first cover end comprises protrusions evenly distributed around the inner circumference such that these protrusions are able to face the container and are in engagement with the measuring unit for enabling the transferring of torsional force between the cover and the measuring unit when the cover is attached to the measuring unit, and wherein the first cover end comprises a protruding inner edge being adapted to bear, as an inner spacing ring, against a free edge of a cap of the measuring unit, which edges protrude in the longitudinal direction of the cap, such that undesired discharging of fluid is prevented.

43. A cover according to claim 42, wherein the cover is adapted for detachable guarantee closure against the container.

44. A cover for protecting a measuring unit for fixed and variable measuring of fluid, wherein the cover is configured for leak-proof and removable attachment to a container and the measuring unit, wherein the cover is substantially hollow for receiving the measuring unit and has a closed first end being adapted for covering the cap and an open second end being adapted for detachable guarantee closure against the measuring unit, and wherein the closed first end comprises protrusions evenly distributed around the inner circumference such that said protrusions are able to face the container and are in engagement with the measuring unit for enabling transferring of torsional force between the cover and the measuring unit when the cover is attached to the measuring unit, wherein the closed first end comprises a protruding inner edge being adapted to bear against the measuring unit such that undesired discharging of fluid is prevented, and wherein the protruding edge bears against a freely longitudinally protruding end portion of a first cap end of a measuring cap for fixed and variable measuring of fluid when the cover is attached to the measuring unit, the measuring cap being configured for leak-proof and removable attachment to the container and detachable reception of a measuring actuator, the cap comprising at least three openings, a discharge opening and an actuator receiving opening at the first end and a fluid inflow opening at a second end being configured for leak-proof and removable attachment to the container, wherein the measuring cap has at least one fluid catching edge at the first end, the fluid catching edge extending circumferentially around the cap in a plane being perpendicular to the centre axis of the cap and adapted to guide any leakage of fluid to the discharge opening, such that any leaking fluid joins the fluid coming out of the discharge opening, wherein the fluid catching edge has a varying projecting length around the first edge end, and wherein the fluid catching flange has a substantially constant projecting length at a cap air opening and the discharge opening and a varying projecting length between said openings.

\* \* \* \* \*

UNITED STATES PATENT AND TRADEMARK OFFICE
CERTIFICATE OF CORRECTION

PATENT NO.        : 8,485,397 B2                                          Page 1 of 1
APPLICATION NO. : 12/600058
DATED             : July 16, 2013
INVENTOR(S)       : Hans Borje Hammarin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 701 days.

Signed and Sealed this
Eighth Day of September, 2015

Michelle K. Lee
*Director of the United States Patent and Trademark Office*